(12) United States Patent
McNamara et al.

(10) Patent No.: US 11,730,090 B2
(45) Date of Patent: Aug. 22, 2023

(54) CLOSED FARM SYSTEM WITH AIR FLOW CONTROL

(71) Applicant: Freight Farms, Inc., Boston, MA (US)

(72) Inventors: Brad McNamara, Boston, MA (US); Jon Friedman, Boston, MA (US)

(73) Assignee: FREIGHT FARMS, INC., Boston, MA (US)

( * ) Notice: Subject to any disclaimer, the term of this patent is extended or adjusted under 35 U.S.C. 154(b) by 243 days.

(21) Appl. No.: 16/801,092

(22) Filed: Feb. 25, 2020

(65) Prior Publication Data

US 2020/0329648 A1   Oct. 22, 2020

Related U.S. Application Data

(60) Provisional application No. 62/810,028, filed on Feb. 25, 2019.

(51) Int. Cl.
*A01G 9/24* (2006.01)
*A01G 9/02* (2018.01)

(52) U.S. Cl.
CPC ............ *A01G 9/246* (2013.01); *A01G 9/249* (2019.05); *A01G 9/022* (2013.01)

(58) Field of Classification Search
CPC ........ A01G 9/246; A01G 9/022; A01G 31/02; A01G 31/06; A01G 9/24–249; F21V 29/60; F21V 29/83; F21Y 2105/16
See application file for complete search history.

(56) References Cited

U.S. PATENT DOCUMENTS

| | | | |
|---|---|---|---|
| 8,651,704 B1* | 2/2014 | Gordin | F21V 33/0092 362/294 |
| 2008/0101065 A1* | 5/2008 | Hsu | F21V 29/67 362/234 |
| 2009/0310373 A1* | 12/2009 | Burkhauser | F21V 31/03 362/373 |
| 2011/0203096 A1* | 8/2011 | Hargreaves | A01G 7/045 29/428 |
| 2012/0020071 A1* | 1/2012 | McKenzie | A01G 9/249 362/231 |
| 2013/0000185 A1* | 1/2013 | Tanase | A01G 9/249 47/17 |
| 2014/0115958 A1* | 5/2014 | Helene | A01G 31/06 47/17 |
| 2014/0144079 A1* | 5/2014 | Lin | A01G 9/249 47/62 R |
| 2016/0360712 A1* | 12/2016 | Yorio | A01G 9/1423 |
| 2017/0311560 A1* | 11/2017 | Agari | A01G 31/02 |
| 2017/0354099 A1* | 12/2017 | Haughton | A01G 7/045 |
| 2019/0059241 A1* | 2/2019 | Bogner | A01G 9/24 |

(Continued)

FOREIGN PATENT DOCUMENTS

WO   WO-2018037188 A1 *   3/2018   ............. A01G 9/249

*Primary Examiner* — Yvonne R Abbott-Lewis
(74) *Attorney, Agent, or Firm* — ArentFox Schiff LLP

(57) ABSTRACT

A closed farm system for efficient plant production is provided. The closed farm system may have an air flow control system operable to direct air flow past plants growing within the system. The air flow control system may be operable to control heating and cooling of lighting panels and air flow ductwork within the closed farm system. The closed farm system may also have a plurality of LED lights mounted on one or more sheets supported by a frame assembly.

21 Claims, 21 Drawing Sheets

(56) References Cited

U.S. PATENT DOCUMENTS

| | | | |
|---|---|---|---|
| 2019/0159415 A1* | 5/2019 | Bertram | A01G 9/26 |
| 2019/0223386 A1* | 7/2019 | Limpert | F21V 33/0096 |
| 2020/0037414 A1* | 1/2020 | Deng | A01G 7/045 |
| 2020/0154660 A1* | 5/2020 | Cuello | A01G 31/06 |

* cited by examiner

CLOSED FARM SYSTEM WITH AIR FLOW CONTROL

CROSS-REFERENCE TO RELATED APPLICATIONS

This application claims priority to U.S. Provisional Application No. 62/810,028, entitled "CLOSED FARM SYSTEM WITH AIR FLOW CONTROL," filed on Feb. 25, 2019. The disclosure of the priority application is incorporated in its entirety herein by reference.

BACKGROUND

The need for fresh food is growing as the population increases and changes in the climate impact growing seasons. The current food supply model, based on traditional farming methods and long distance shipping, is economically and environmentally unsustainable. Traditional farming operations are usually located in agricultural areas, which require large upfront costs and large acreage and have high operational costs from seed to sale.

Urban and local agriculture also faces obstacles. Growing space in urban areas is limited and not sufficient to meet a high demand. High start-up and operating costs of greenhouses make local crop production difficult for many businesses. Structures intended to support rooftop greenhouses must be evaluated by structural engineers and often require additional bracing to support the weight. Urban gardens often must address contaminated soil. Hydroponics systems are not easily used in urban locales, as most hydroponic systems are meant to be installed in agricultural settings, are not easily transportable, and require extensive training of personnel for operation.

Contained agricultural systems have recently been developed to address these issues. For example, a growing system in a modular container, described in U.S. Pat. No. 9,288,948, has been developed for generating high-yield crops. Within the modular container, the growing system includes a germination station for nurturing seeds until they germinate into plants, a plurality of vertical racks to hold the growing plants, a lighting system to provide appropriate light for the plants, an irrigation system to provide nutrients to the plants, a climate control system to control the environmental conditions within the container, and a ventilation system for providing airflow to the plants.

SUMMARY

A closed farm system is provided for efficient plant production. In some embodiments, the closed farm system includes an air flow control system.

In some embodiments, the air flow control system is operable to direct air flow past plants growing within the closed farm system. In some embodiments, the air flow control system is operable to control heating and cooling of lighting panels and air flow ductwork within the closed farm system.

DESCRIPTION OF THE DRAWINGS

Reference is made to the following detailed description taken in conjunction with the accompanying drawings in which.

DETAILED DESCRIPTION

Figure 1:
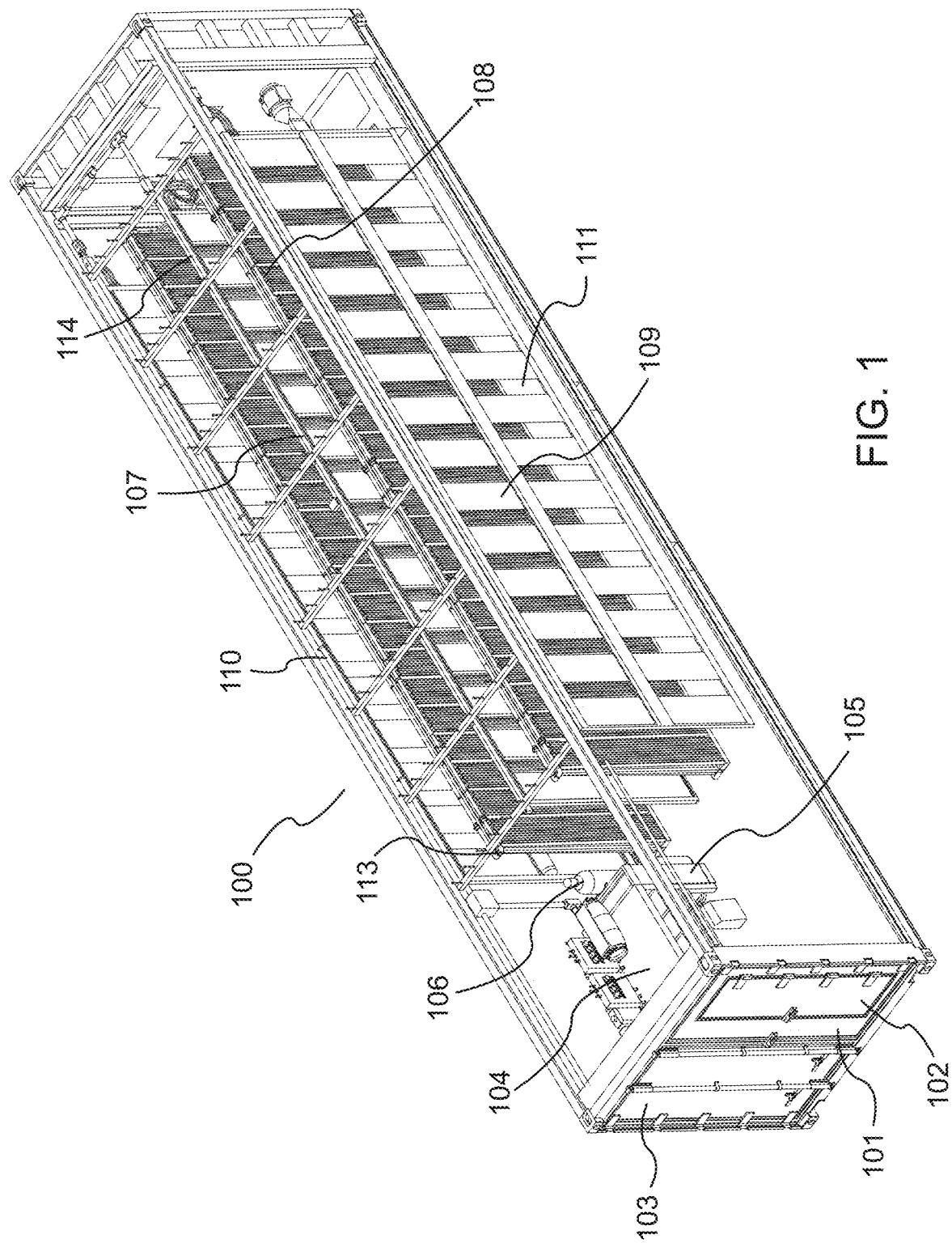
FIG. 1 is an isometric view of an embodiment of a farm container, with long, outer side and ceiling walls removed for visibility.
Figure 2:
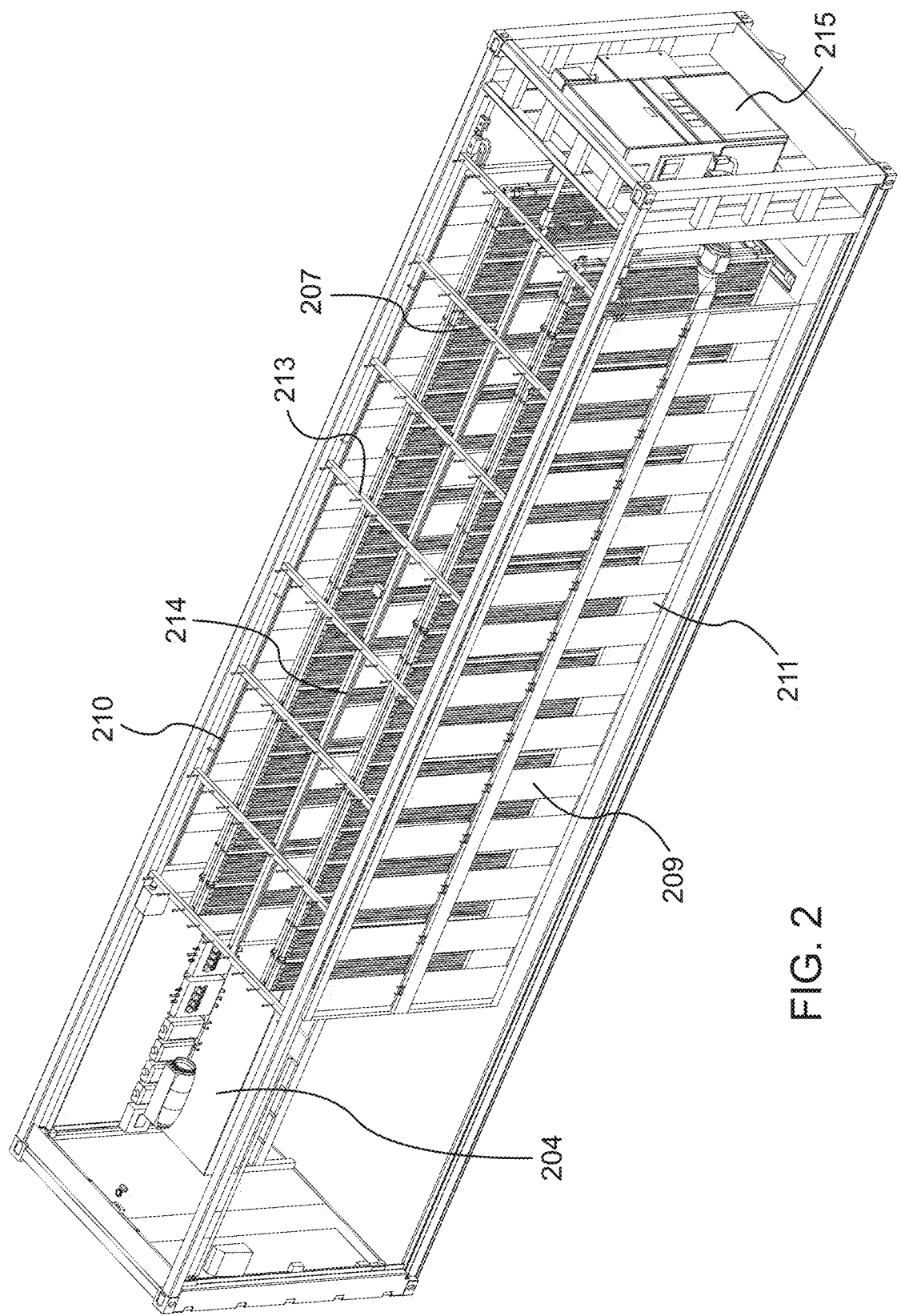
FIG. 2 is a further isometric view of the farm container of FIG. 1.

FIGS. 1 and 2 illustrate an embodiment of a closed farm system. The farm container 100 can be provided as a farm container 100 having a frame to which walls can be attached. For better visibility of the interior of the container 100, long side walls and a ceiling are not shown. The interior of the farm container 100 can include a work area and a grow area. The closed farm system can be provided in other types of housing, such as a barn, warehouse, or the like.

Figure 22:
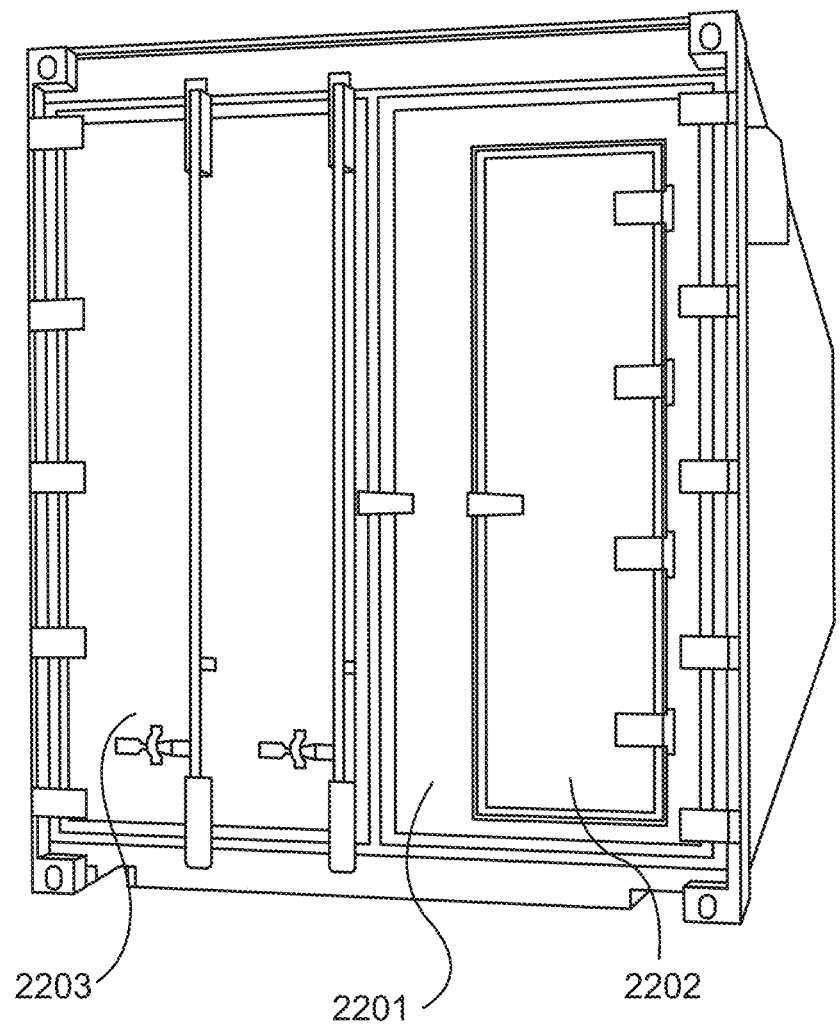
FIG. 22 is a front end view of the farm container of FIG. 1.
Figure 23:
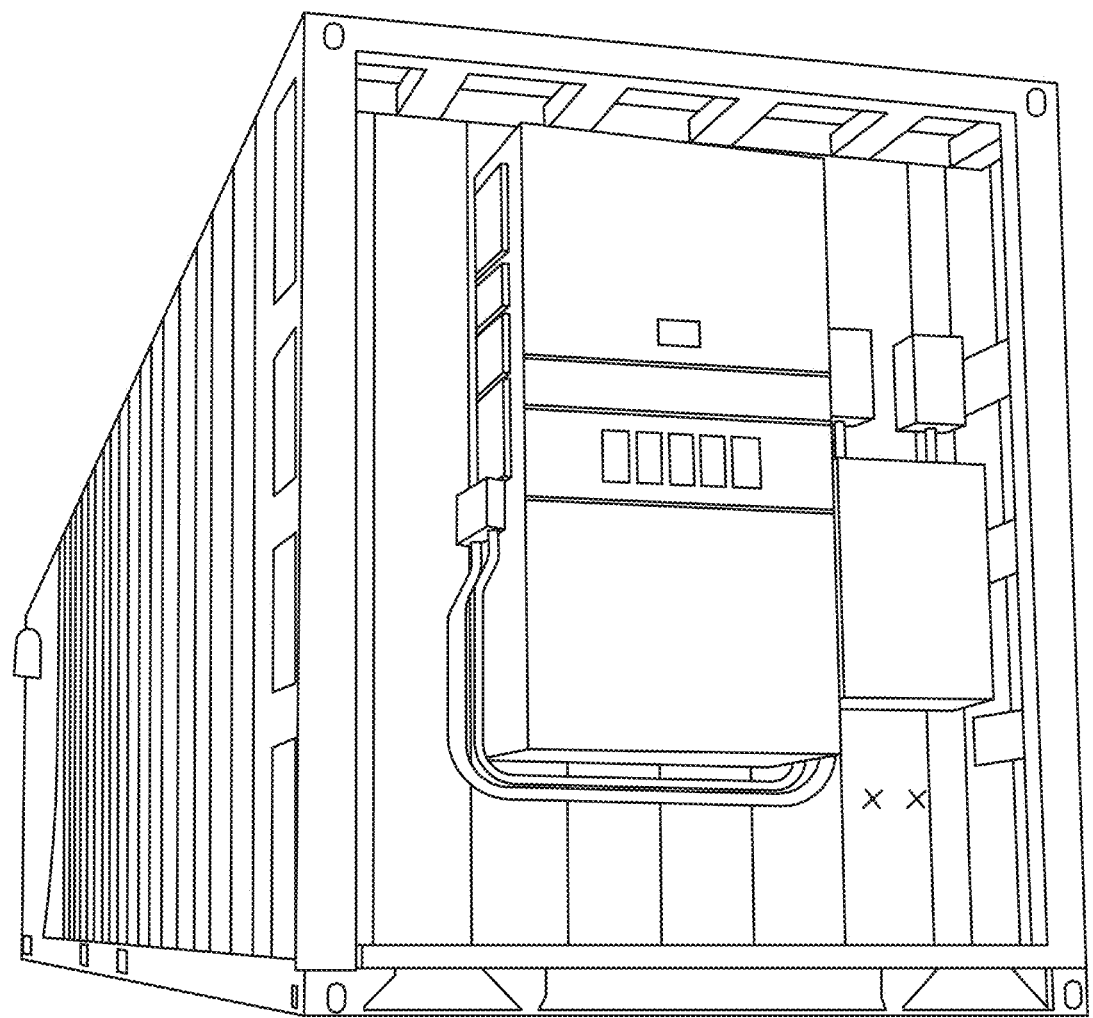
FIG. 23 is a rear end view of the farm container of FIG. 1.
Figure 24:
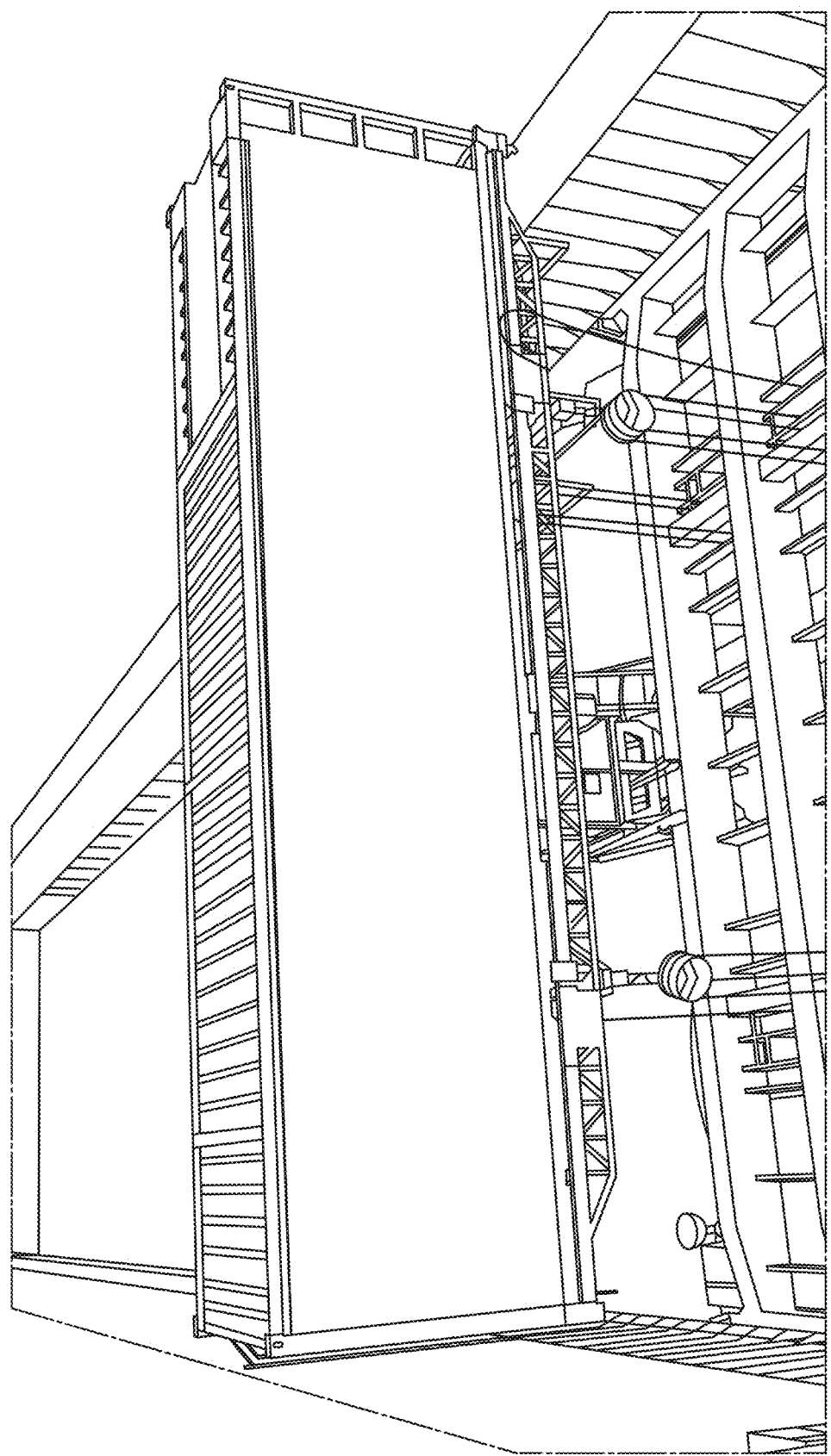
FIG. 24 is an isometric view of the farm container of FIG. 1 hoisted by a crane.

In some embodiments, a front end wall of the container 100 can include a large door 101 for entry of a farmer and large equipment, plants, supplies, tools, and the like. A smaller door 102 within the large door 101 can also be provided for entry by a farmer when a larger opening is not needed. For example, in some embodiments, the smaller door 102 can have a width of 22 inches. The front end wall can also include a large cargo door 103 that can be opened in addition to the large door 101, through which larger items and equipment can be moved. In some embodiments, the container 100 can be a refrigerated intermodal freight container. The floor can be a slotted floor, and can have a non-slip and/or grooved surface. In some embodiments, the container 100 can have insulation within the walls. In some embodiments, the insulation can have an R value of R16 or R28. Other R values can be used. In FIG. 22, a farm container includes a large door 2201, a small door 2202, and a large cargo door 2203.

Figure 16:
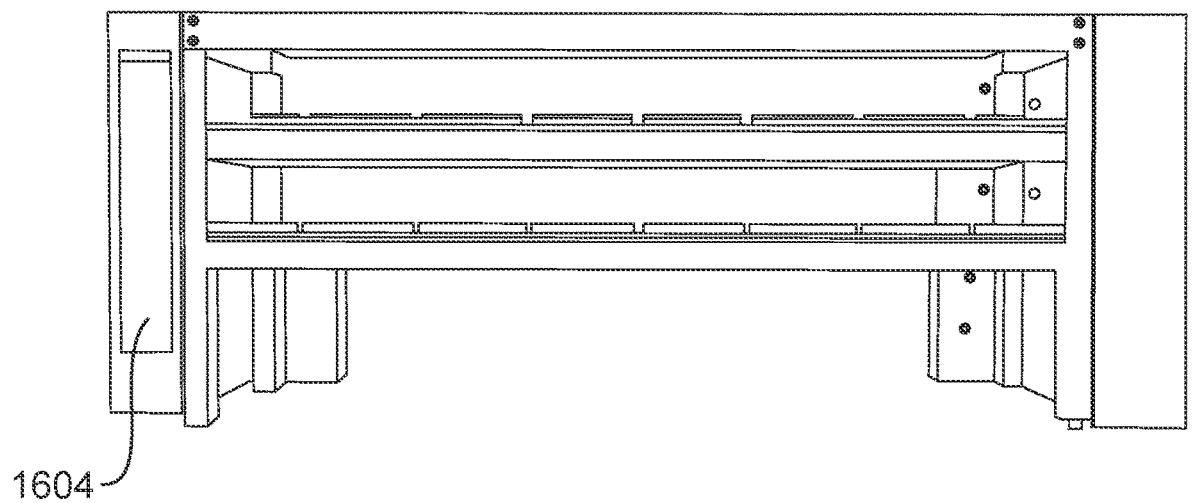
FIG. 16 is a front view of a seedling table of the farm container of FIG. 1.
Figure 17:
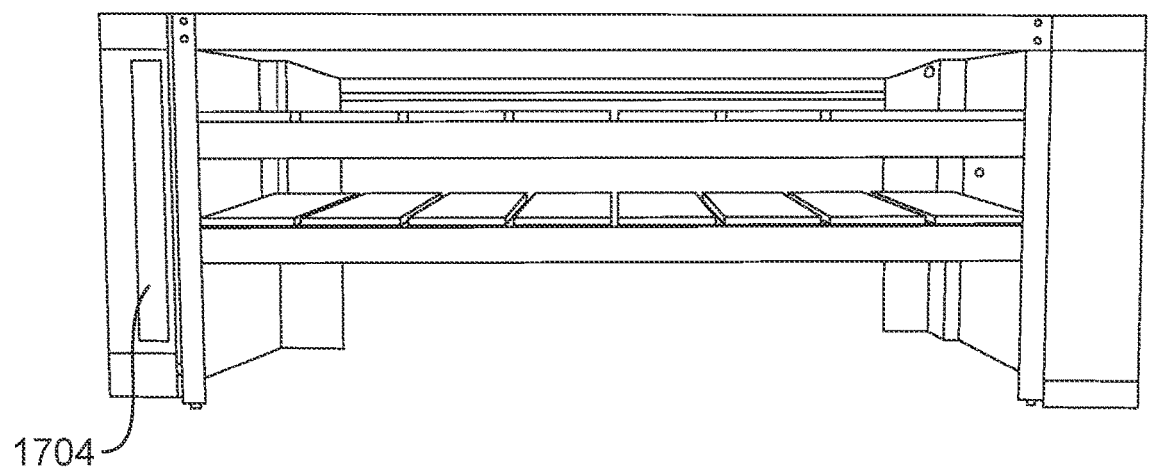
FIG. 17 is a further front view of the seedling table of FIG. 10.

Within the work area of the container 100, a seedling table 104 (204 in FIG. 2) can be provided. In some embodiments, an upper surface of the seedling table 104 can be used as a work surface. In some embodiments, the seedling table 104 can include one or more generally horizontal shelves below the work surface for supporting seedling trays. LED lighting can be 30 provided above each shelf to provide illumination for seedlings in the seedling trays. A leveling system can be provided to level the seedling table 104. Plumbing and electrical lines can be integrated into the framing structure of the table 104. The seedling table 104 can be made of any suitable material, such as stainless steel or aluminum. FIG. 16 shows a seedling table 1604. FIG. 17 shows a seedling table 1704.

A seed tank 105 with nutrients for seedlings in seed trays can be provided. In some embodiments, equipment can be mounted on the outer long side wall adjacent the work surface. The equipment can include one or more nutrient reservoirs; one or more pumps, such as peristaltic pumps; and one or more sensors, such as hydro sensors. A control panel, such as a touch screen, can be provided to allow the farmer to access a control system to control farm processes and obtain data for the farm container 100. A $CO_2$ canister 106 can be located within the work area, for example, adjacent to the seedling table 104.

Within the grow area of the container 100, a plurality of plant panels 107 (207 in FIG. 2) can be mounted on grow racks 108 (208 in FIG. 2). In the embodiment illustrated, two grow racks 108 are provided, a left grow rack and a right grow rack. The plant panels 107 can be suspended in rows from the grow racks 108. In some embodiments, two walls of plant panels 107 are suspended from each grow rack. In some embodiments, each row can include a first wall in which the plant panels 107 are oriented such that plants grow facing one direction and a second wall in which the plant panels 107 are oriented such that plants grow facing an opposite direction.

In the embodiment shown, each plant panel includes five vertical or columnar grow channels, although any number of grow channels can be provided. Each grow channel includes two opposed vertical lips along the vertical edges to assist in holding a growing medium within the grow channel. In some embodiments, the growing medium can be a suitable foam material sized to fit within each grow channel. The foam material can have a slit or series of slits in which plants can be supported.

Within the grow area, a plurality of lighting panels 109 (209 in FIG. 2) can be provided. The lighting panels 109 can include a plurality of LED lights oriented to face each of the plant panels 107. In some embodiments, one or more lighting panels 109 can be mounted adjacent to each outer long side wall of the container 100. For example, a left LED wall 110 (210 in FIG. 2) and a right LED wall 111 (211 in FIG. 2) can be provided. In some embodiments, one or more lighting panels 109 can be provided in a central region of the container 100. In some embodiments, the lighting panels 109 in the central region can be provided as a mobile LED wall 110, described further below.

Figure 12:
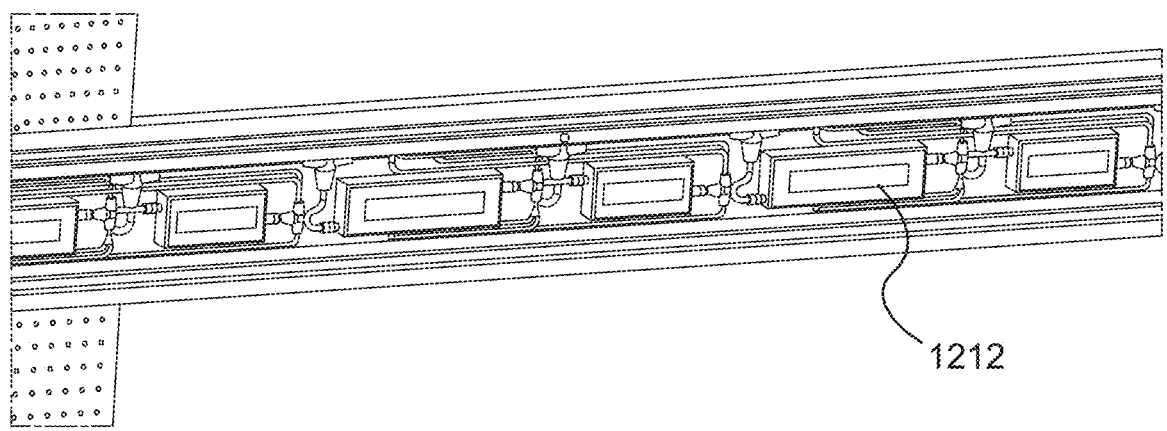
FIG. 12 is a partial cut away view of ballast elements on a lighting panel.

In some embodiments, a ballast 1212 (FIG. 12) to regulate the current for the LED lights can be provided on the lighting panel. In some embodiments, the ballast can be provided in a mid-region of the lighting panel. In some embodiments, the ballast can be mounted to extend generally horizontally along the lighting panel, for example, in the mid region. In some embodiments, the ballast can be provided as multiple ballast elements that control selected groups of the LED lights. For example, one or more ballast elements can control one or more groups of blue LED lights, and one or more ballast elements can control one or more groups of red LED lights. See FIG. 12. In this manner, parameters such as the duration and frequency of light for the plants can be controlled and can be varied depending on the type of plant.

Figure 3:
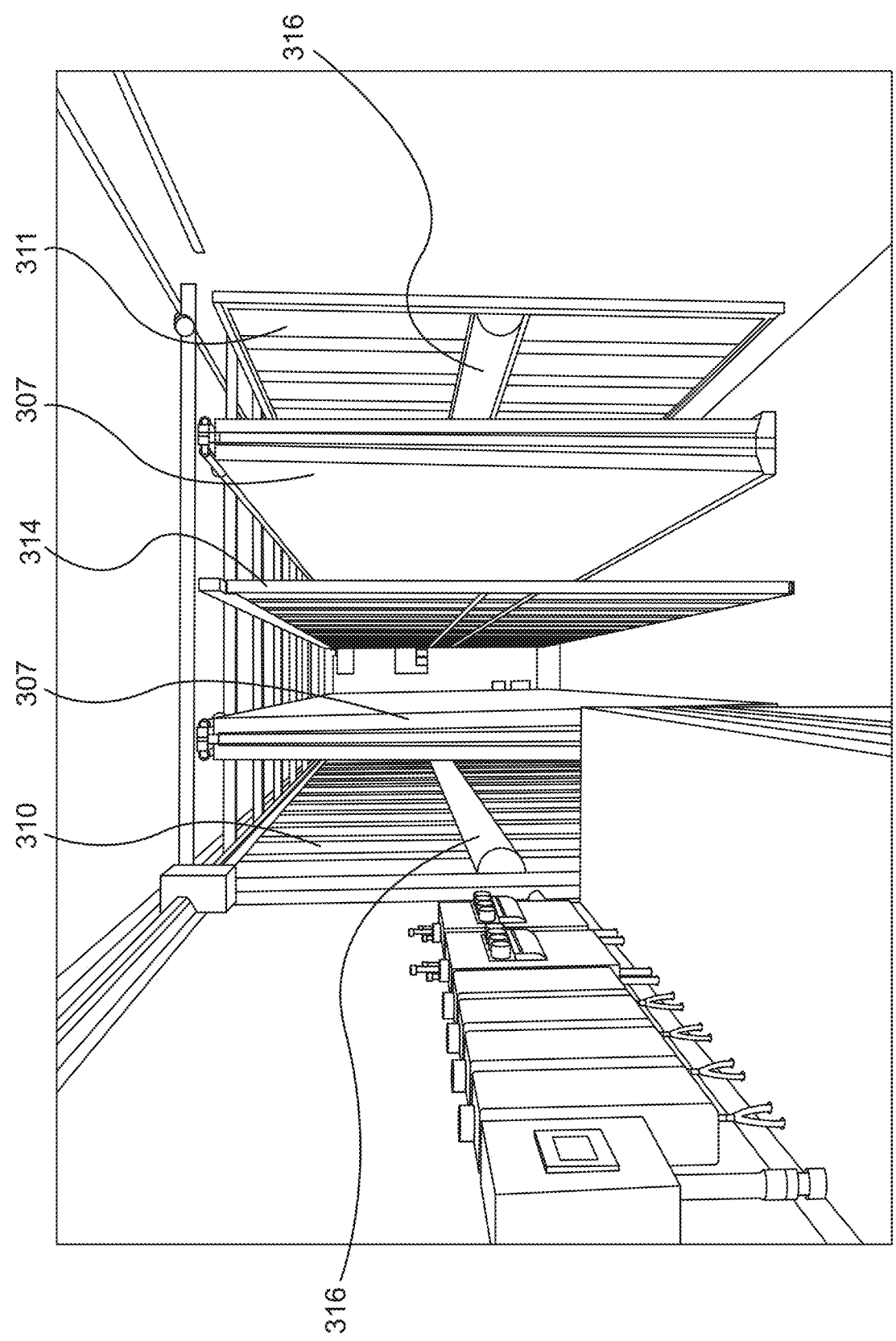
FIG. 3 is an interior view of the farm container of FIG. 1 with plant panels and lighting panels spaced about equally across a width of the container.
Figure 4:
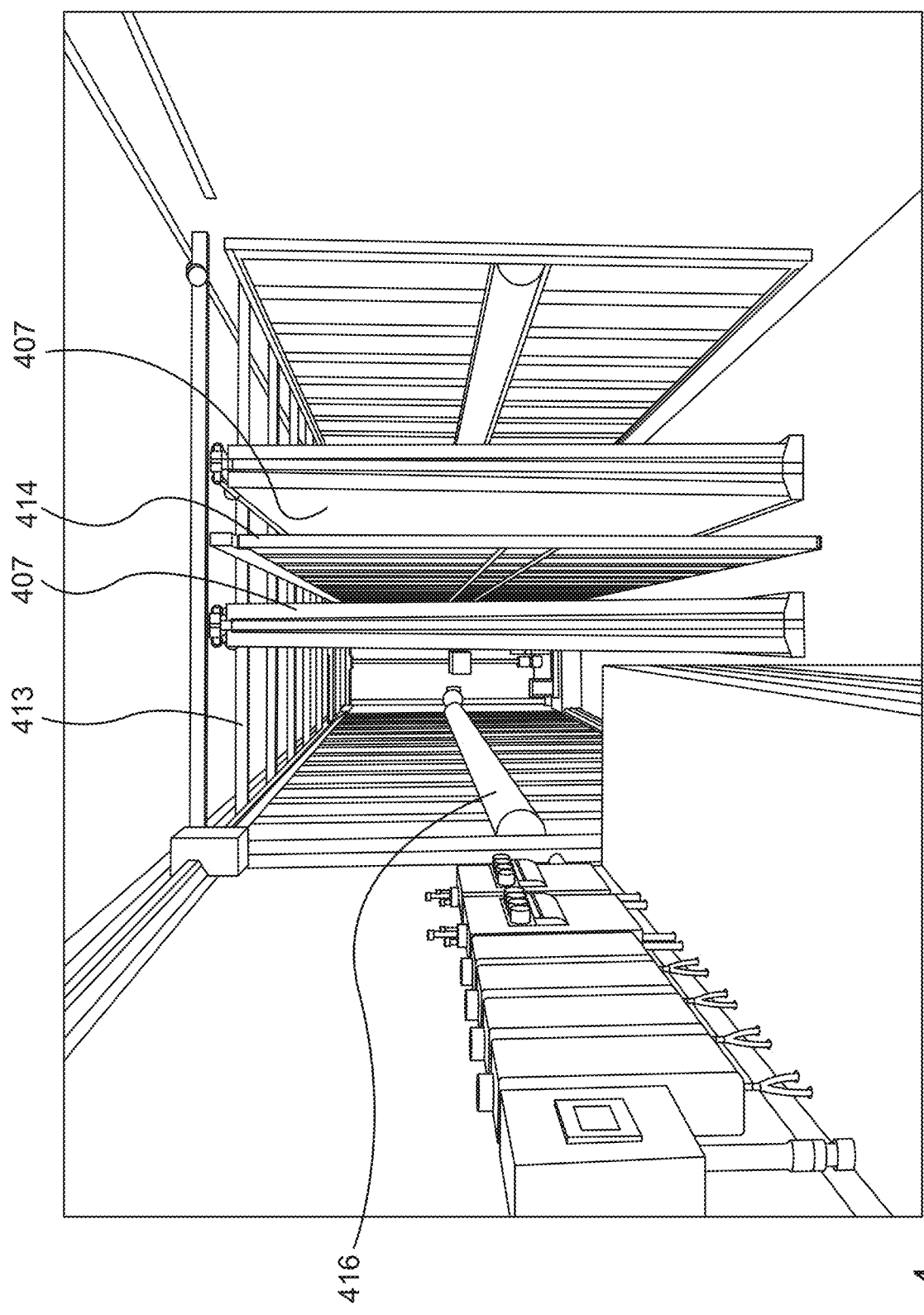
FIG. 4 is an interior view of the farm container with plant panels moved toward a center of the container.
Figure 5:
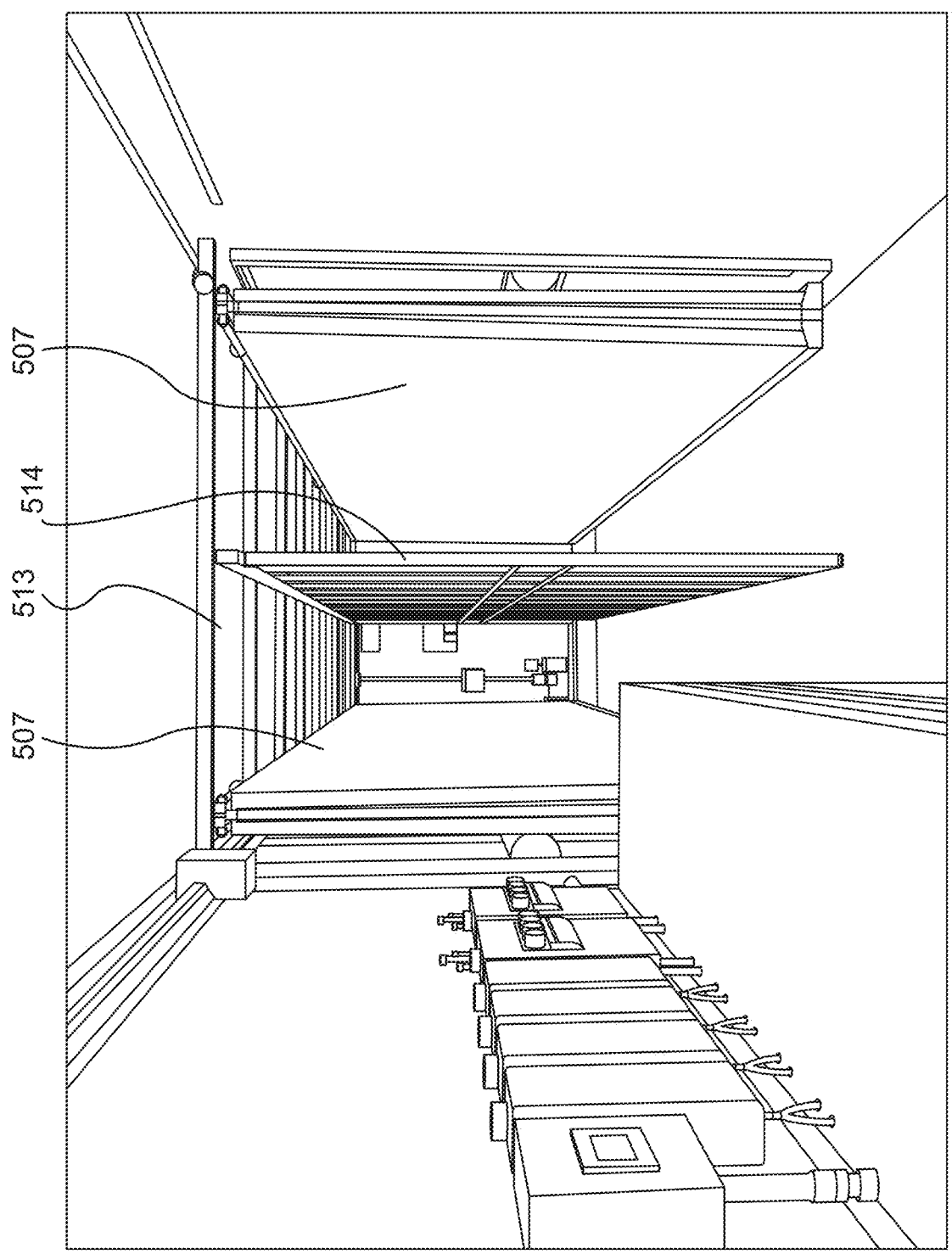
FIG. 5 is an interior view of the farm container with plant panels moved toward the long outer side walls of the container.
Figure 6:
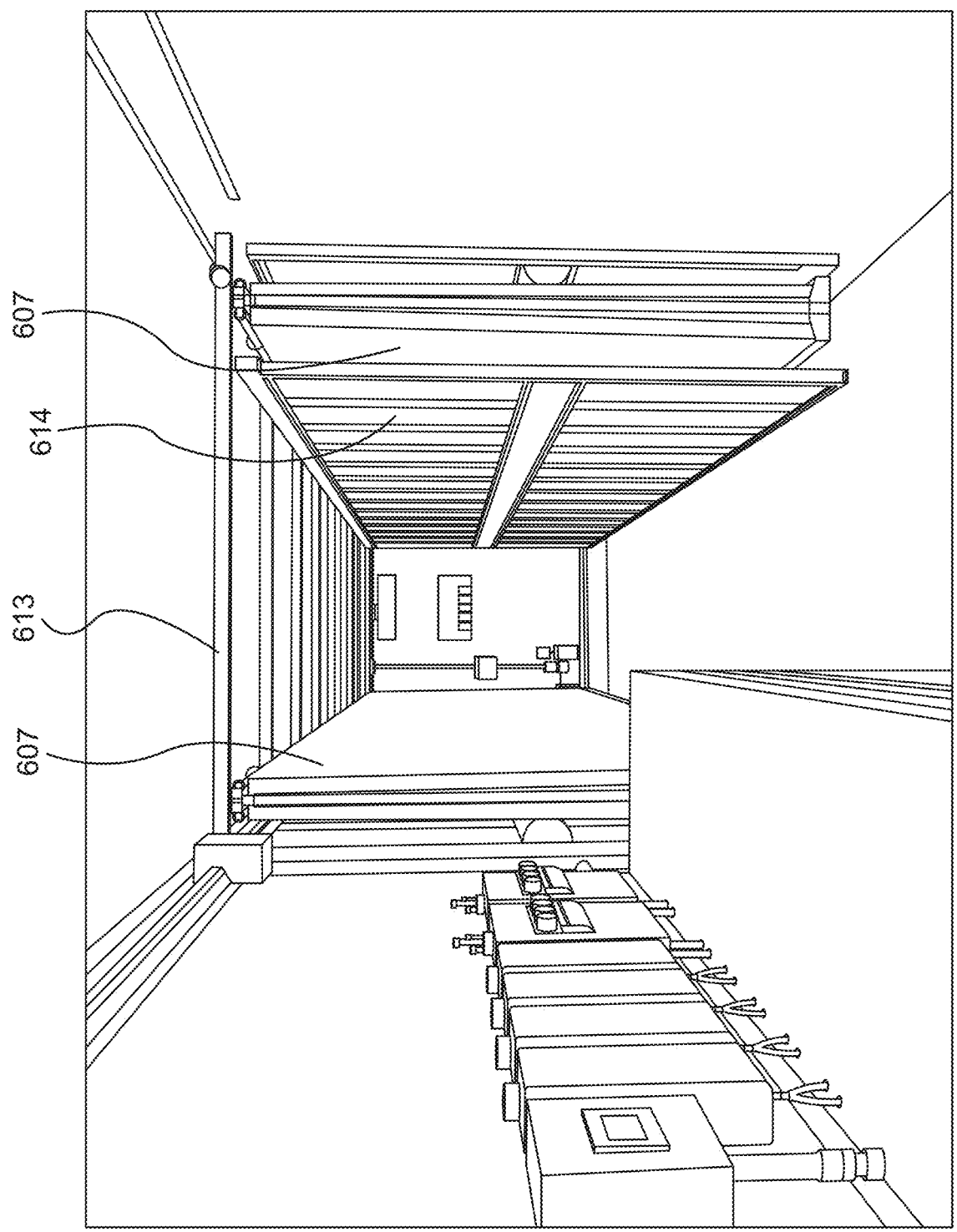
FIG. 6 is an interior view of the farm container with the central lighting panel moved toward one of the long outer side walls of the container.
Figure 7:
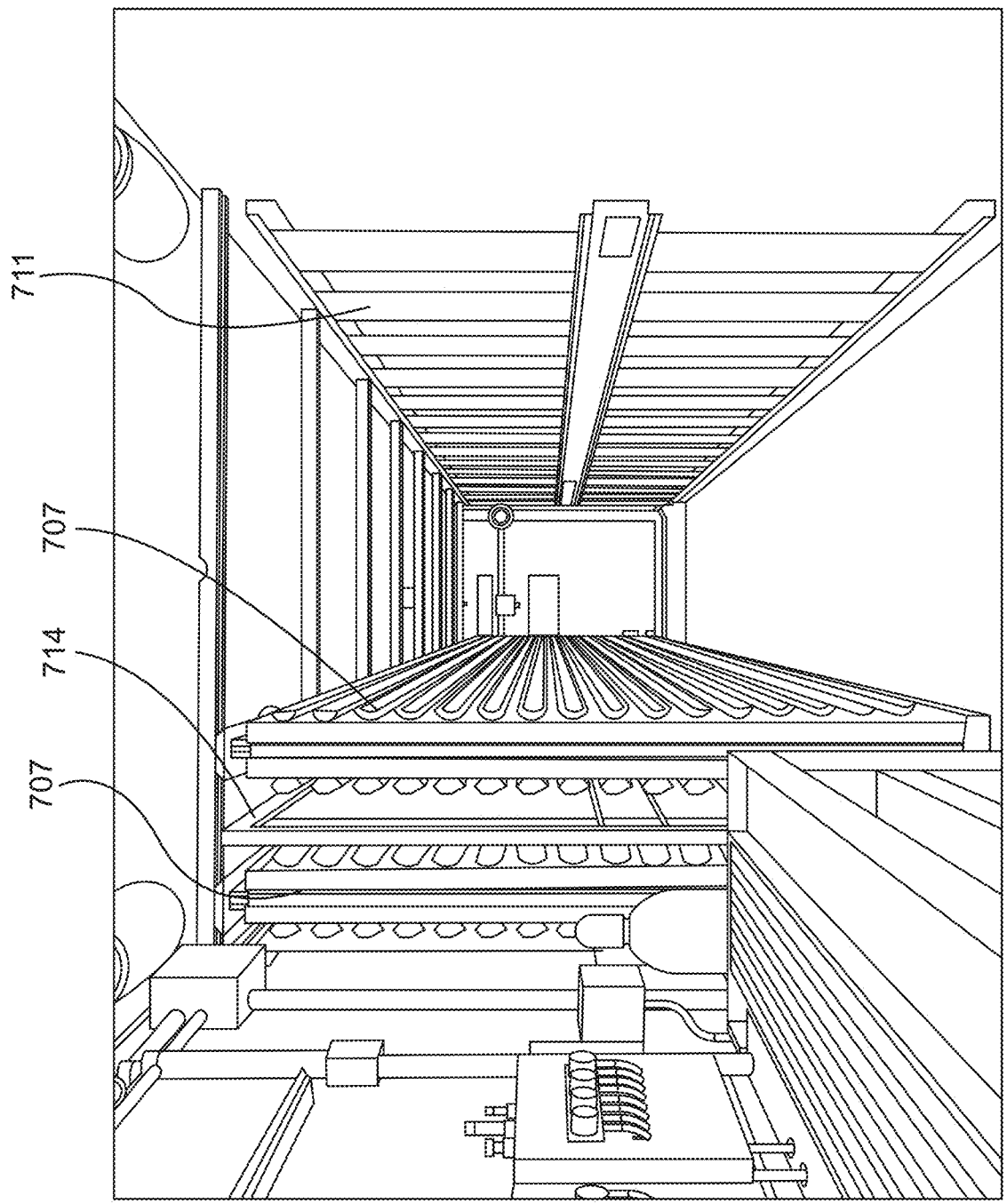
FIG. 7 is an interior view of the farm container with the central lighting panel and plant panels moved toward an opposite one of the long outer side walls of the container.
Figure 18:
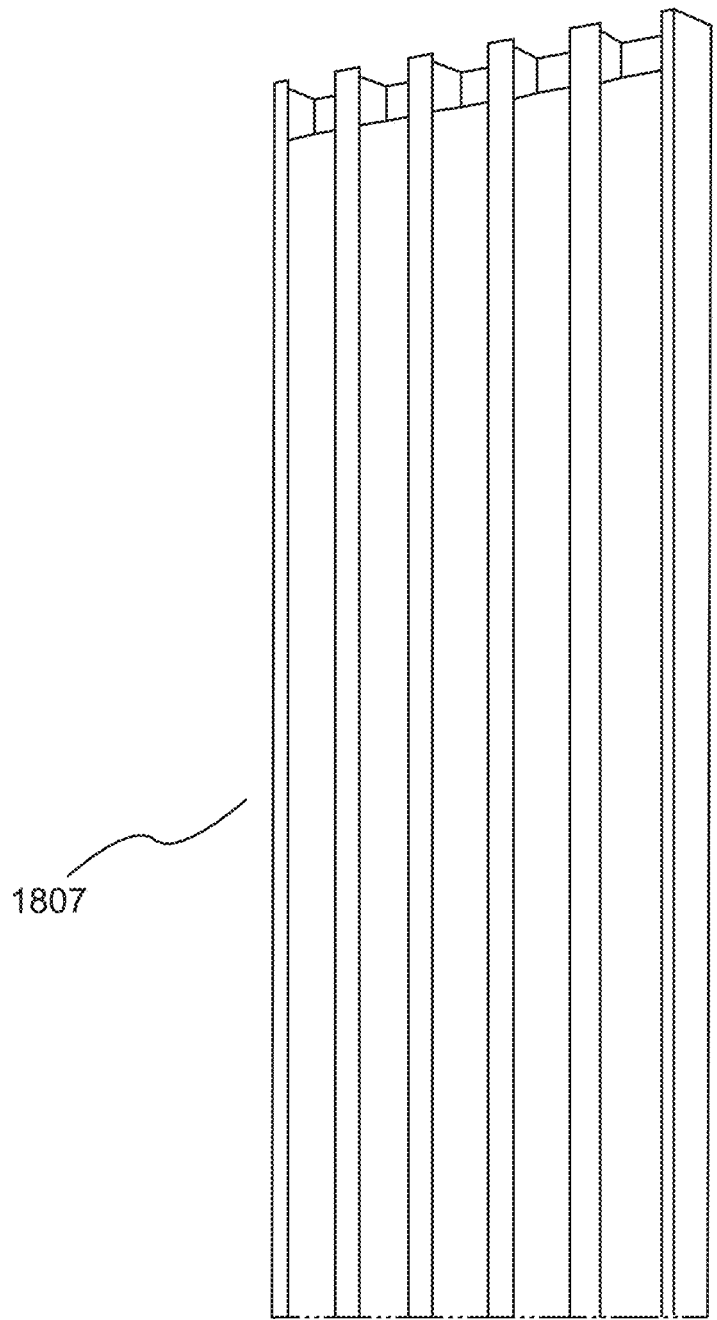
FIG. 18 is a front view of a plant panel.
Figure 19:
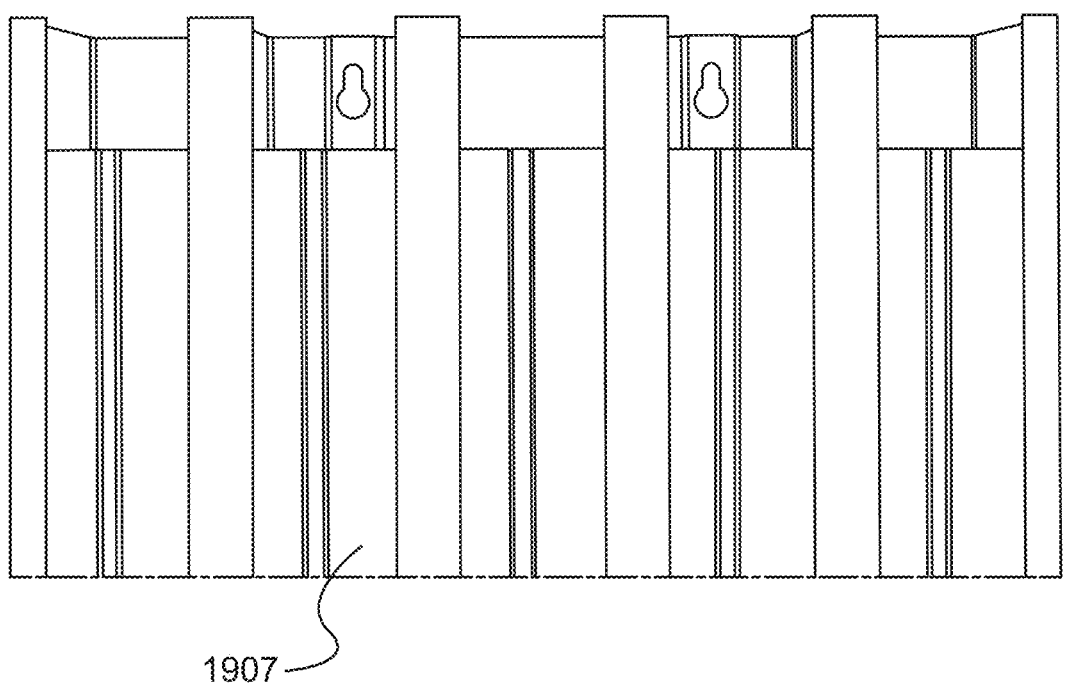
FIG. 19 is a partial view of the plant panel of FIG. 18.

A rail system can be provided within the container 100. The rail system can include one or more rails 113 disposed across a width of the container 100 near a ceiling. The grow racks 108 and the central lighting panels 114 (mobile LED wall) can be mounted from the rail system so that the plant panels 107 and central lighting panels can be moved along the rails from side to side. Any suitable trolley or carrier mechanism can be used to move the plant panels 107 and the central lighting panels 114. FIG. 18 shows a plant panel 1807. FIG. 19 shows a plant panel 1907. Movement can be motorized or by hand or both. In some embodiments, as shown in FIG. 3, the central lighting panel 314 can be located in a central region of the container, and the plant panels 307 can be spaced generally equally between the central lighting panels 114 and the exterior lighting panels (in LED walls 310 and 311). In FIG. 4, plant panels 407 are shown moved toward the central region of the container. In FIG. 4, the rail system can include one or more rails 413. The central lighting panels 414 (mobile LED wall) can be mounted from the rail system. In FIG. 5, the 15 plant panels 507 are shown moved toward the outer side walls of the container. In FIG. 5, the rail system can include one or more rails 513. The central lighting panels 514 (mobile LED wall) can be mounted from the rail system. In FIG. 6, the central lighting panels 614 are shown moved toward one of the outer side walls. In this manner, a farmer can move the plant panels 607 and the central lighting panels 614 as needed, for example, to provide additional room to mount or dismount a plant panel from a grow rack, to tend plants within the plant panel, and the like. In FIG. 6, the rail system can include one or more rails 613. In some implementations, as shown in FIG. 7, the central lighting panels 714 can be mounted from the rail system so that the plant panels 707 and the central lighting panels 714 can be moved along the rails from side to side. The plant panels 707 can be placed between the central lighting panels 714 and the exterior lighting panels (LED walls 711).

Figure 20:
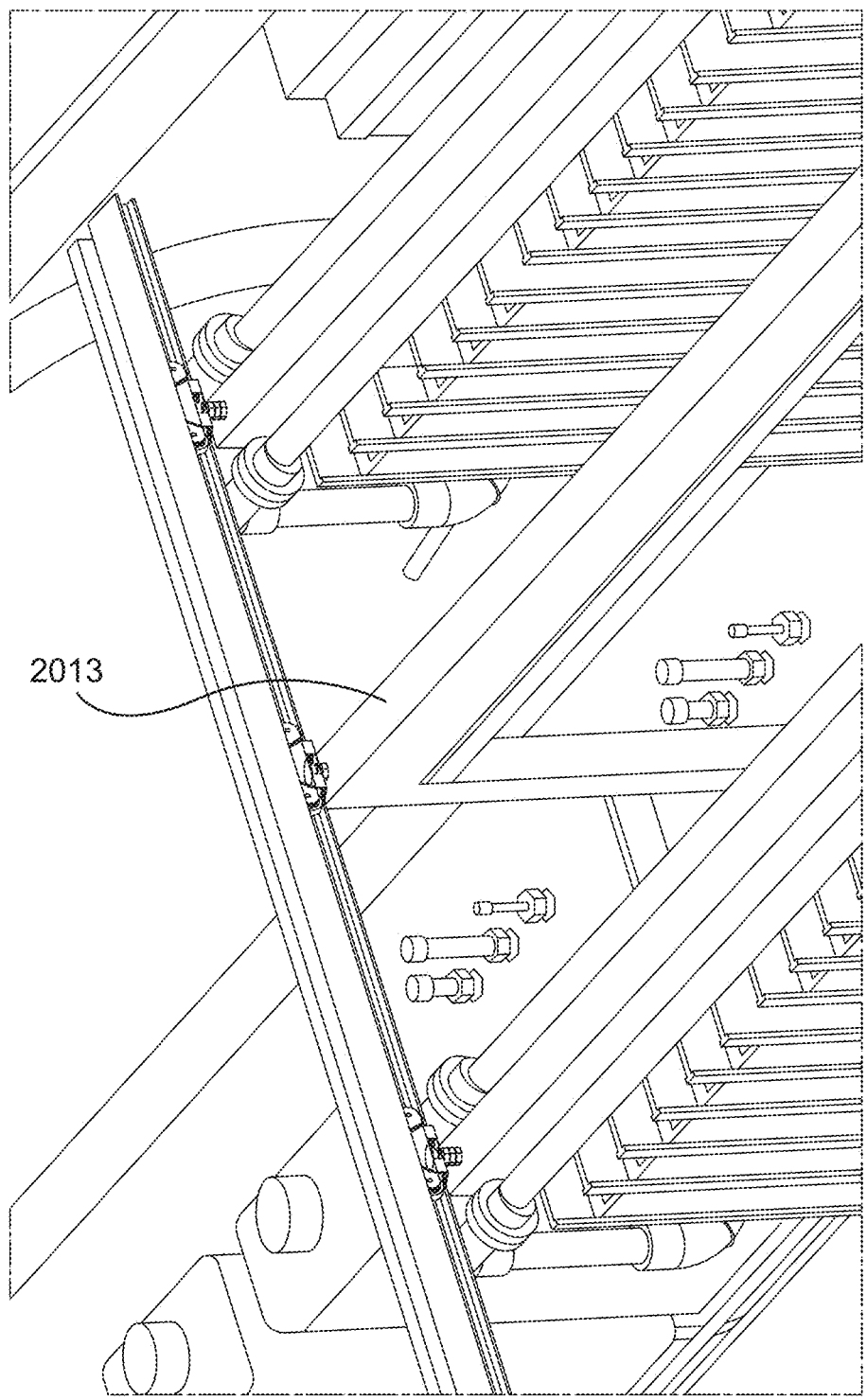
FIG. 20 is a partial view of a rail system of the farm container of FIG. 1.
Figure 21:
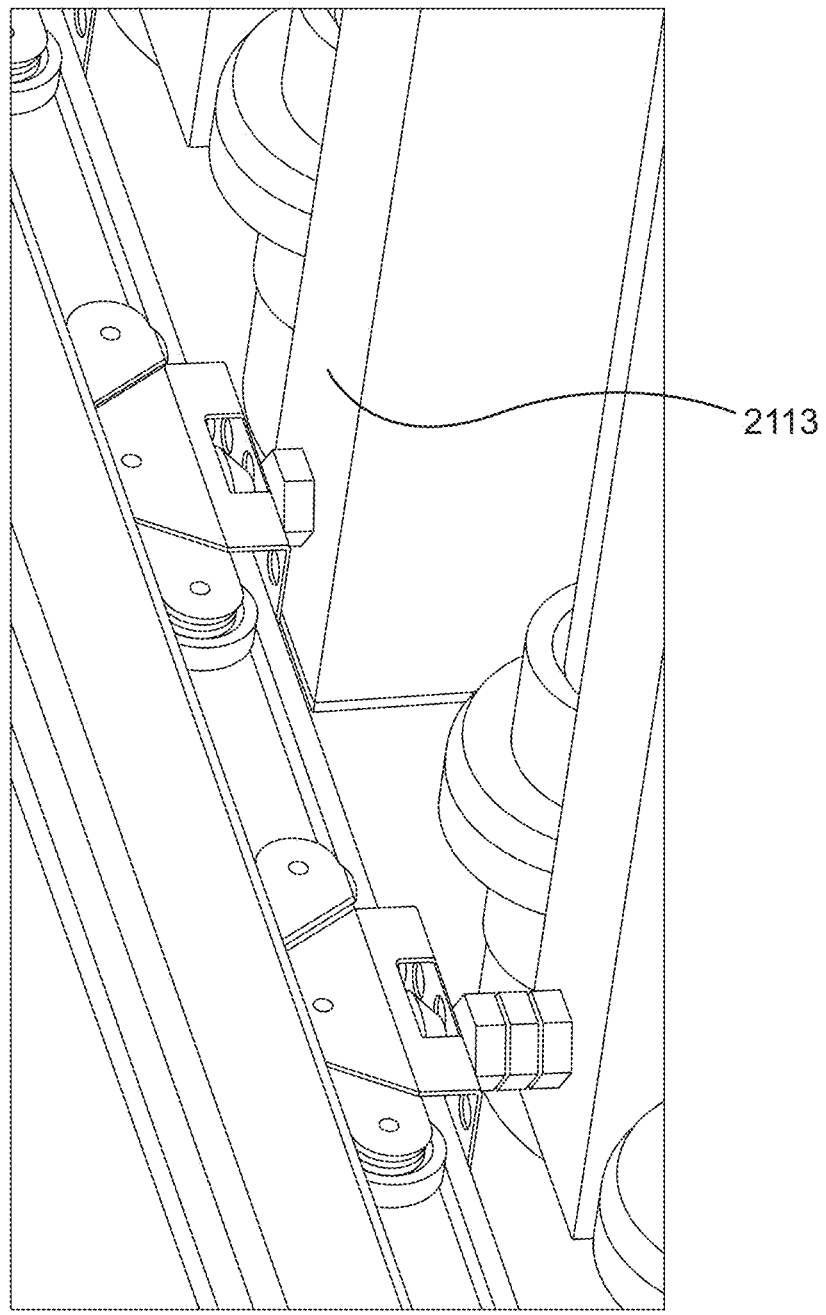
FIG. 21 is a further partial view of the rail system of FIG. 20.

FIGS. 20 and 21 illustrate more particularly one embodiment of a trolley or carrier mechanism to move the plant panels and lighting panels. Each rail 2013 can include a track, and a wheeled carriage can be provided at each end of an upper beam from which the plant panels and light panels can be fixed. Each wheeled carriage can include one or more wheels or rollers that fit within the track for travel along the track. Piping and fixtures to supply a nutrient solution to the upper ends of each plant panel can be mounted to travel with the plant panels. FIG. 21 shows a partial view of a rail system 2113.

Because the plant panels and lighting panels are movable, the number of plant panels can be varied to accommodate the desired crop or crops to be grown. In the embodiment illustrated, two plant rows with four plant walls are shown.

In some embodiments, one or more additional plant rows can be provided, with each plant row providing two plant walls. A suitable number of additional lighting panels can be provided to provide illumination to each plant wall. In some embodiments, crops of different sizes can be grown in the same container.

A rear end wall of the container can be used to mount equipment such as an electrical box 215 (FIG. 2) and HVAC equipment box. In some embodiments, a 60 amp, 120/240 volt single-phase, or 120/208 volt three-phase connection can be provided. In some embodiments, a 100 amp, 120/240 volt single-phase or 120/208 volt three-phase connection can be provided.

In some embodiments, the HVAC equipment can include an air conditioner, economizer, dehumidifier, and fan. In some embodiments, a 24,000 BTU ductless mini-split air conditioning unit can be used. In some embodiments, a 36,000 BTU unit with dehumidifier and economizer can be used. An intake and HVAC inlet to the HVAC box can be provided at the rear end wall. An air return can also be provided at the rear end wall. The economizer can be provided to draw in outside air when conditions allow. The dehumidifier can remove the ambient moisture, condense the moisture, filter it and recycle it back into the farm's water supply. In some embodiments, a 0.5 gal/day dehumidifier can be used. In some embodiments, a 1.88 gal/day dehumidifier can be used. The dehumidifier can be stand-alone or integrated into the air conditioning unit.

In some embodiments, an air mover can be provided within the container. In some embodiments, an air mover can be mounted near the ceiling near the front end of the container. In some embodiments, the air mover can provide generally horizontal air flow past plants growing on the plant panels. In some embodiments, an exhaust fan can be provided within the container, for example, along an exterior wall near the front end of the container, spaced a distance from the HVAC equipment box.

Ductwork 316 (FIG. 3), 416 (FIG. 4) can be connected to the HVAC box to transport conditioned air throughout the interior of the container. In some embodiments, ductwork for the air flow can be mounted to each lighting panel (310-311). In some embodiments, the ductwork can be mounted in a generally horizontal orientation on each lighting panel. In some embodiments, the ductwork can be mounted in or near a mid-region of each lighting panel. In some embodiments, the ductwork can be mounted closer to an upper or lower end of the lighting panels. In some embodiments, the ductwork can be mounted adjacent to the lighting ballast.

One or more duct fans can be mounted in line with the HVAC box within the container to transport air into the ductwork. In some embodiments, a duct fan can be provided on each side of the container to transport air to the ductwork along each of the exterior lighting panels.

Referring to FIGS. 3, 4, 10, and 11, in some embodiments, the ductwork 1116 (FIG. 11) mounted to each lighting panel can include a semi-cylindrical configuration with a plurality of apertures 1117 (FIG. 11) formed therein through which air can flow out toward and past the plants growing in the plant panels. Thus, air flow can be directed upwardly and/or downwardly past the plants, as determined by the pattern of apertures 1117. The air flow rate can also be controlled via the duct fans as appropriate for the growing plants. For example, the air flow rate can be controlled to provide a gentle circulating air flow to avoid disrupting plants. In other examples, the air flow can be controlled to provide a stronger air flow, such as a wind, which can be useful to strengthen growing plants. The air flow can be controlled to vary the air flow past the plants. Thus, natural growing conditions can be suitably emulated.

Figure 8:
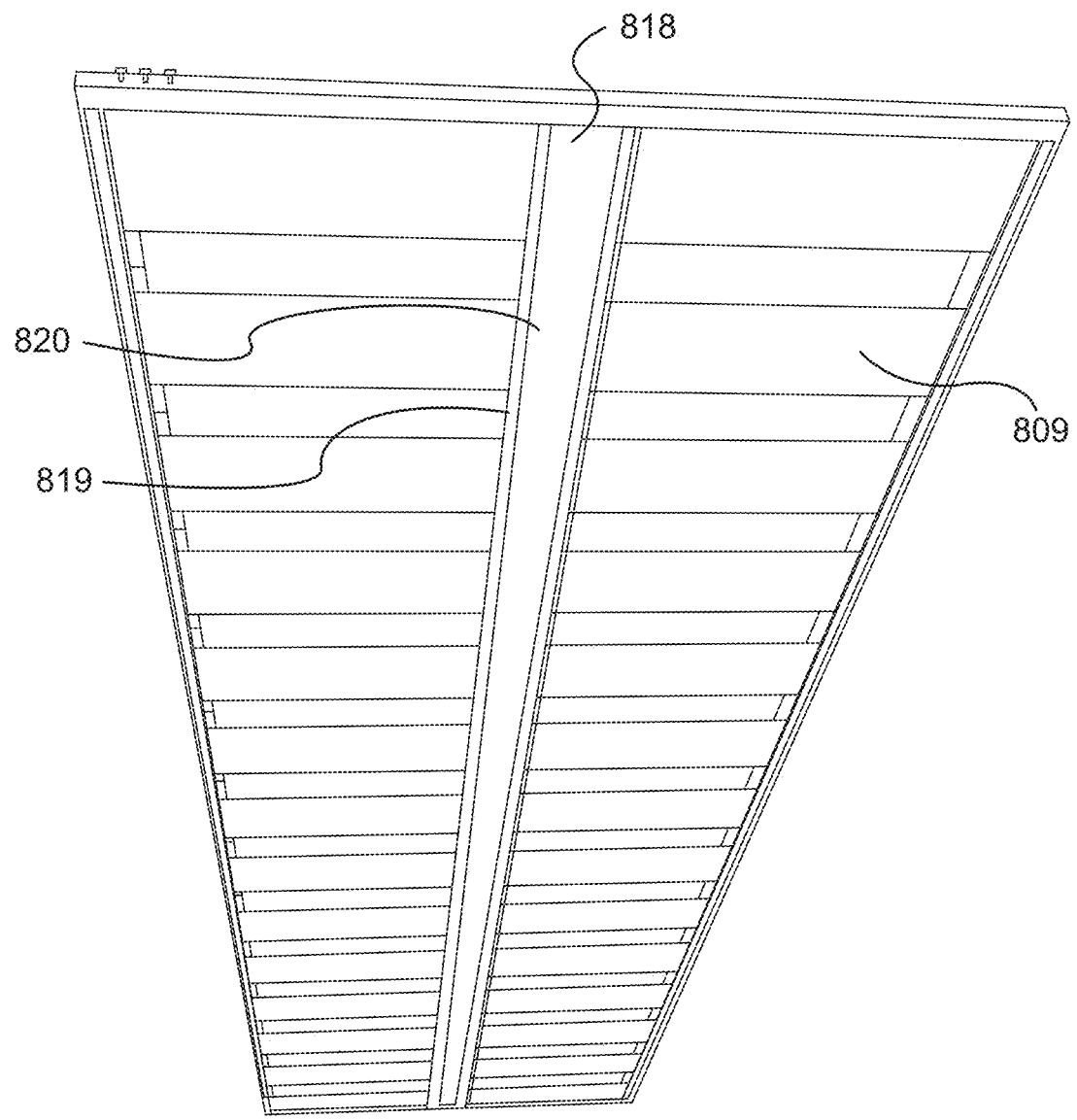
FIG. 8 is an isometric view of a central lighting panels.
Figure 9:
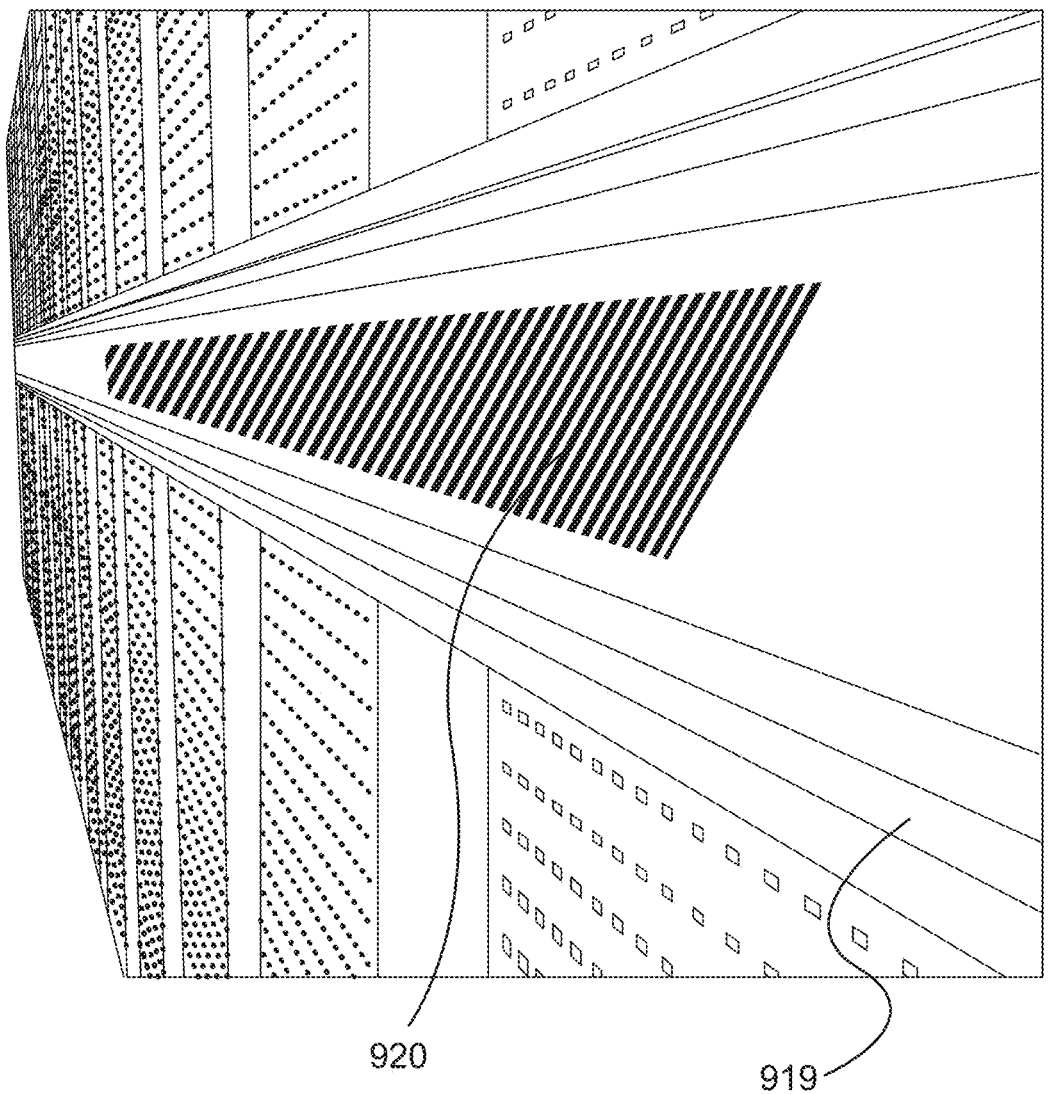
FIG. 9 is a partial view of the central lighting panels of FIG. 8.
Figure 13:
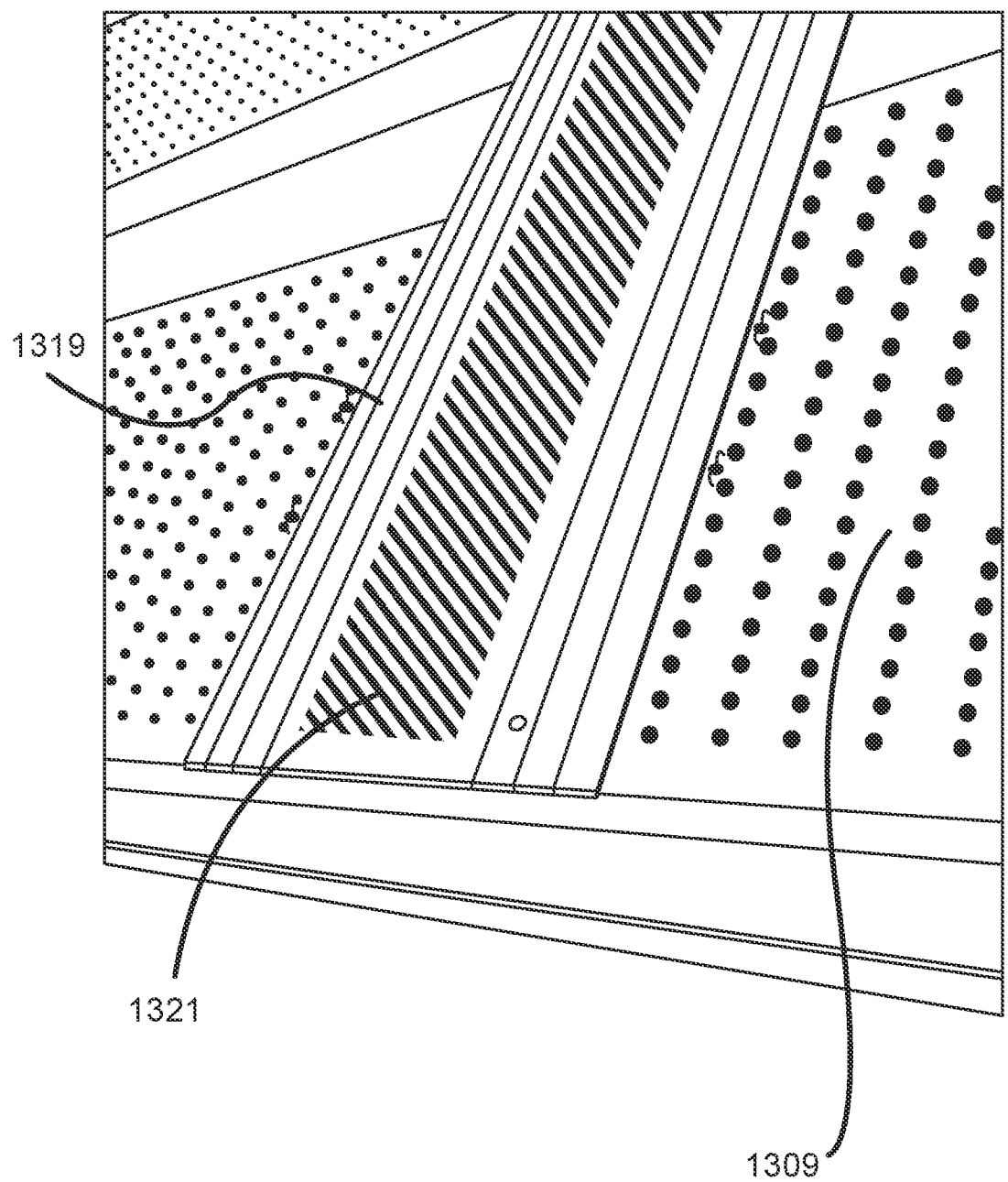
FIG. 13 is a partial view of a central lighting panel.
Figure 14:
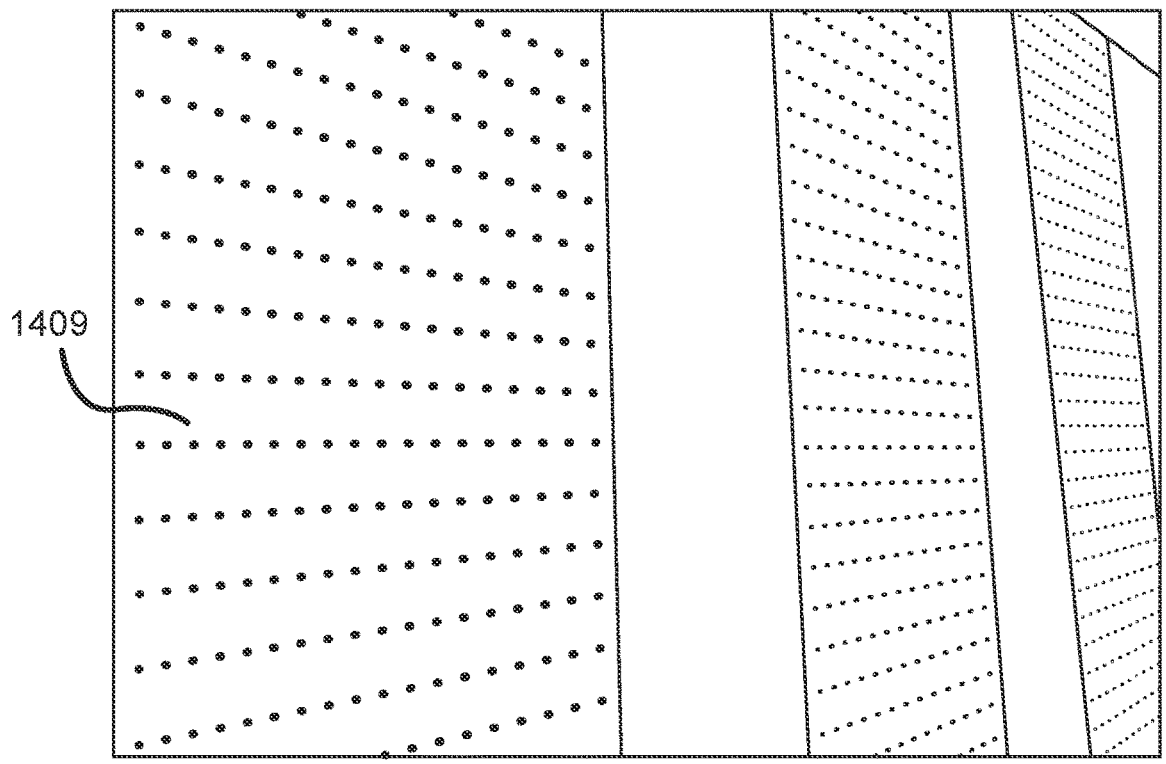
FIG. 14 is a partial view of a lighting panel with red and blue LED lights.
Figure 15:
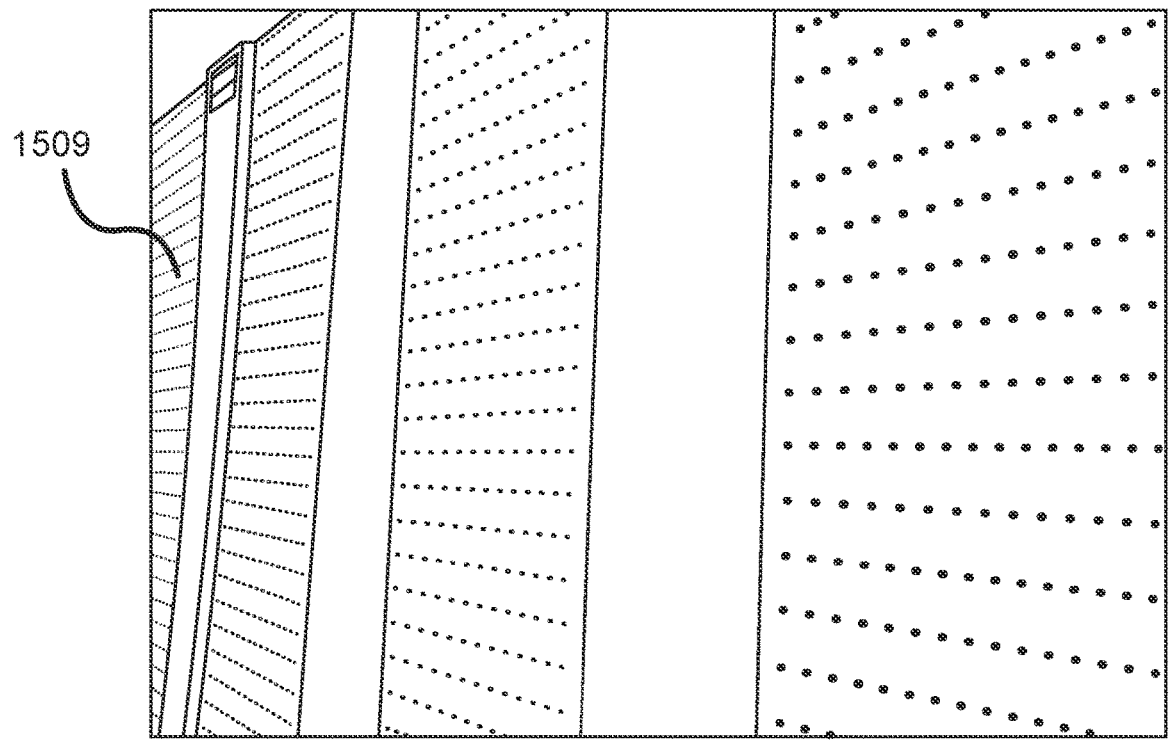
FIG. 15 is a further partial view of a lighting panel with red and blue LED lights.

Referring more particularly to FIGS. 8, 9, and 13, the lighting panels can be formed with a frame assembly including an outer frame supporting a plurality of sheets that mount the plurality of LED lights. A horizontal frame element 818 (FIG. 8) is located at a mid-region of the panel. The sheets of LED lights in lighting panel 809 can be supported by the horizontal 10 frame element, such that some sheets are above the horizontal frame element and some sheets are below the horizontal frame element. Work light strips 819, such as white LED lights, can be mounted above and below the ventilation panel 820. The outer frame, LED sheets, and horizontal frame element can each be formed of any suitable material, such as aluminum. In FIG. 9, work light strips 919, such as white LED lights, can be mounted above and below the ventilation panel 920. In FIG. 13, the sheets of LED lights in lighting panel 1309 can be supported by the horizontal frame element. Work light strips 1319 may include white LED lights. FIG. 14 shows a lighting panel 1409 with red and blue LED lights. FIG. 15 shows a lighting panel 1509 with red and blue LED lights.

In some embodiments, the frame element can include a central ventilation panel with slots that allow air flow therethrough. See FIGS. 10, 13. In some embodiments, the ventilation panel can include angled slots 1321 (FIG. 13). In some embodiments, such as on a central lighting panel, two closely adjacent ventilation panels can be provided with alternately angled slots, to provide a crossing pattern of slots.

Figure 10:
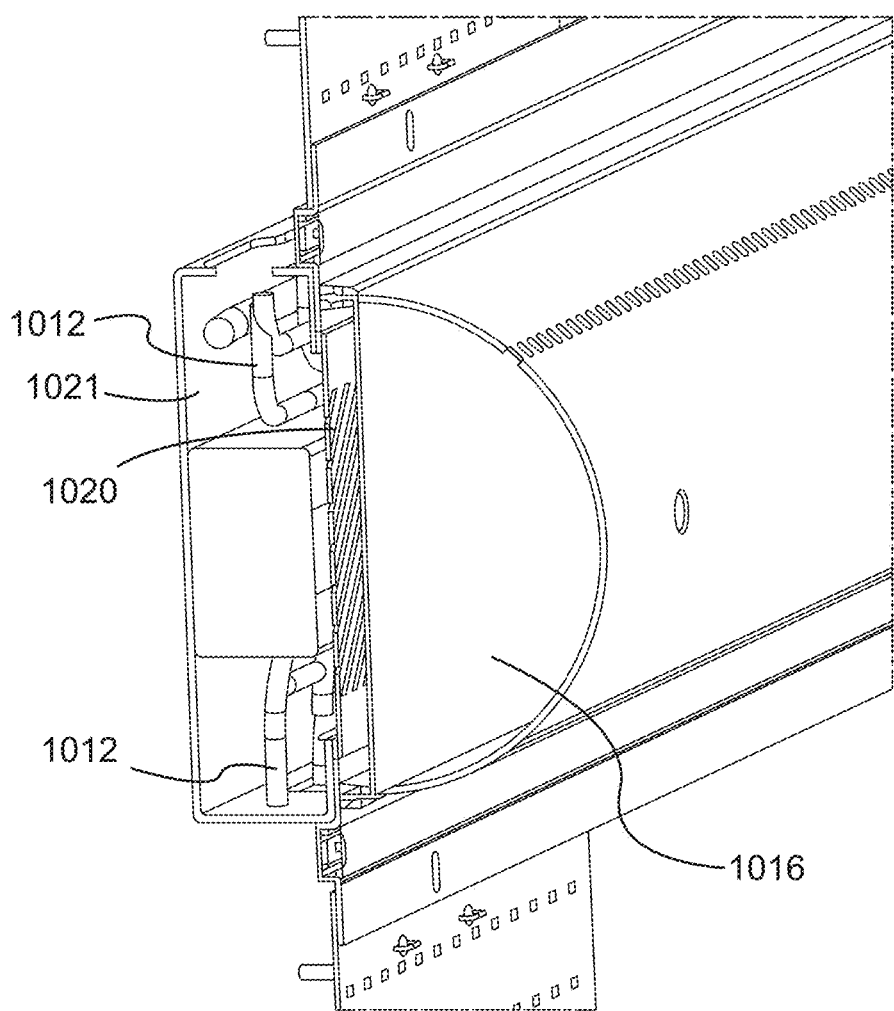
FIG. 10 is a partial isometric view of an embodiment of air flow ductwork disposed on a lighting panel.
Figure 11:
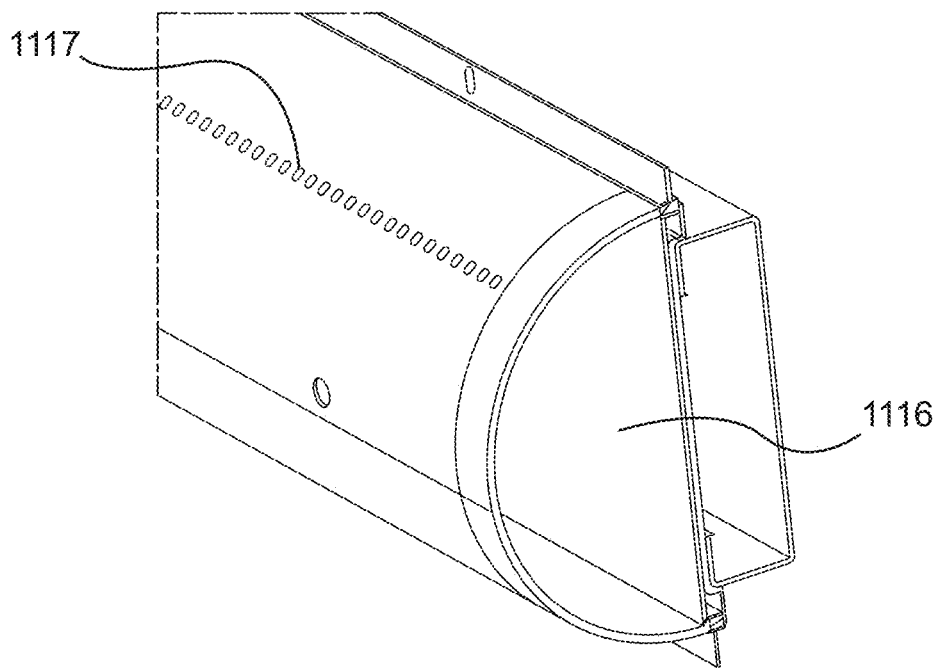
FIG. 11 is a further partial isometric view of air flow ductwork disposed on a lighting panel.

In some embodiments, the air flow ductwork 1016 (FIG. 10) can be mounted to the frame element 1021 in longitudinal alignment with the ventilation panel 1020 on the lighting panels, such as the lighting panels mounted to the outer side walls. In some embodiments, the ductwork 1016 can be removably mounted to the frame element, such as with hook and loop fasteners, mechanical fasteners, and the like. As noted above, a lighting ballast 1012 is provided to regulate the current to the LED lights on each lighting panel. In some embodiments, the ballast is oriented in alignment with the air flow ductwork that is mounted on each lighting panel. The air flow ductwork provided on each lighting panel can be mounted adjacent or close to the lighting ballast. For example, as illustrated in FIG. 10, the ductwork 1016 can be mounted on one side of the ventilation panel 1020 and the ballast elements 1012 can be mounted on an opposite side of the ventilation panel. In this manner, the air flow through the ductwork can take advantage of the heating provided by the lighting panels to cool the ballast and/or the lighting panels and/or to heat the air flow through the ductwork.

An air flow control system can be provided to control the air flow. In some embodiments, the air can be conditioned or cooled by the HVAC system. The cooled air can be transported to the plants via the ductwork on the lighting panels. The air can additionally cool the ballast elements and/or the lighting panels. Conversely, the ballast elements can warm the air if the air is too cool. Thus, in some embodiments, the air does not have to be separately heated by a heater provided as part of the HVAC system.

In conjunction with other air flow components, such as the air mover discussed above, multiple directions of air flow past the plants can be provided.

The air flow control system can be part of a computer system that executes programming for control of the various farm systems and equipment, including the air flow and lighting, as described herein. The flow rate and timing of air flow can be controlled to provide a suitable air circulation pattern. The air flow control system can receive data from various temperature sensors within the container. The air flow control system can be in communication with the HVAC equipment described herein for control thereof.

The computer system can be implemented as or can include a computing device that includes a combination of hardware, software, and firmware that allows the computing device to run an applications layer or otherwise perform various processing tasks. Computing devices can include without limitation personal computers, work stations, servers, laptop computers, tablet computers, mobile devices, hand-held devices, wireless devices, smartphones, wearable devices, embedded devices, microprocessor-based devices, microcontroller-based devices, programmable consumer electronics, mini-computers, main frame computers, and the like.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used, including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one time programmable non-volatile memory (OTPNVM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the method and system described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in these embodiments.

The computing device can include one or more input/output interfaces for connecting input and output devices to various other components of the computing device. Input and output devices can include, without limitation, keyboards, mice, joysticks, microphones, cameras, webcams, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities. Network connection enables the computing device to communicate and interact with any combination of remote devices, remote networks, and remote entities via a communications link. The communications link can be any type of communication link, including without limitation a wired or wireless link. For example, the network connection can allow the computing device to communicate with remote devices over a network, which can be a wired and/or a wireless network, and which can include any combination of intranet, local area networks (LANs), enterprise-wide networks, medium area networks, wide area networks (WANs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission of and receipt of data via the communications link.

The computing device can include a browser and a display that allow a user to browse and view pages or other content served by a web server over the communications link. A web server, server, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), desktop as a service (DaaS), backend as a service (BaaS), test environment as a service (TEaaS), API as a service (APIaaS), and integration platform as a service (IPaaS).

The farm system as described herein can achieve higher plant densities and higher crop yields than prior art modular farm container systems. In some embodiments, plant densities can be twice as great or more. In some embodiments, crop yields can be twice as great or more.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A lighting panel comprising:
   a frame assembly disposed in a mobile container;
   a plurality of light-emitting diode (LED) lights mounted on one or more sheets supported by the frame assembly;
   a ballast assembly supported by the frame assembly; and
   air flow ductwork supported by the frame assembly in heat transfer communication with the ballast and/or the LED lights, wherein the air flow ductwork is disposed longitudinally over the ballast assembly.

2. The lighting panel of claim 1, wherein the frame assembly includes an outer frame and a frame element in a mid-region of the frame assembly, and the air flow ductwork is supported on the frame element.

3. The lighting panel of claim 2, further comprising one or more white LED lights, wherein the white LED lights are supported on the frame element in the mid region of the frame assembly.

4. The lighting panel of claim 2, wherein the frame element comprises one or more ventilation panels having slots therethrough.

5. The lighting panel of claim 4, wherein the ventilation panel has two opposite facing sides, wherein the ductwork is mounted on a first one of the two sides of the ventilation panel, and wherein the ballast elements are mounted on a second one of the two sides of the ventilation panel.

6. The lighting panel of claim 2, wherein the frame element and the air flow ductwork are disposed generally horizontally.

7. The lighting panel of claim 1, wherein the air flow ductwork is configured in a semi-cylindrical configuration with a plurality of apertures therein through which air can flow out in an upward and/or downward direction.

8. The lighting panel of claim 1, wherein the ballast assembly comprises a plurality of ballast elements, and wherein each ballast element is associated with a group of LED lights.

9. The lighting panel of claim 1, wherein the plurality of LED lights include red LED lights and blue LED lights.

10. A closed farm system comprising:
    one or more lighting panels of claim 1; and
    one or more plant panels mounted in a generally vertical orientation facing the lighting panel.

11. The closed farm system of claim 10, further comprising:
    a farm housing; and
    a heating, ventilation, and air conditioning (HVAC) system disposed to provide conditioned air to the air flow ductwork within the farm housing.

12. The closed farm system of claim 11, wherein the air flow control system is in communication with the HVAC system for control thereof.

13. The closed farm system of claim 11, further comprising:
    two outer side walls, each disposed along the length of the farm housing, wherein at least one of the outer side walls has the lighting panel mounted proximal thereto.

14. The closed farm system of claim 11, wherein the housing includes a ceiling, the system further comprising:
    a rail system, wherein the rail system includes one or more rails disposed across a width of the farm housing proximal to the ceiling.

15. The closed farm system of claim 14, further comprising:
    one or more grow racks, wherein the one or more plant panels are suspended from the one or more grow racks, and wherein each of the one or more grow racks and the one or more lighting panels located in the central region are mounted to the rail system whereby the plant panels and central lighting panels are moveable along the one or more rails.

16. The closed farm system of claim 11, wherein at least one of the one or more lighting panels is located in a central region of the farm housing.

17. The closed farm system of claim 10, further comprising an air flow control system operable to control an air flow rate through the air flow ductwork.

18. The closed farm system of claim 17, wherein the air flow control system is operable to control cooling of air through the air flow ductwork to regulate heat transfer between air in the ductwork and the ballast assembly and/or LED lights.

19. The closed farm system of claim 17, further comprising:
    a plurality of temperature sensors, wherein the air flow control system is capable of receiving data from at least one of the plurality of temperature sensors.

20. The closed farm system of claim 17, further comprising:
    a computer system, wherein the computer system is configured to interoperate with the air flow control system and is capable of controlling air flowing through the ductwork and lighting in the lighting panel.

21. The lighting panel of claim 1, wherein the plurality of LED lights and the ballast assembly are positioned in a space defined between a frame element of the frame assembly and a first surface of a ventilation panel and the air flow ductwork is mounted to a second surface of the ventilation panel.

\* \* \* \* \*